J. H. GANO.
Corn Husker.
No. 57,888.  Patented Sept. 11, 1866.
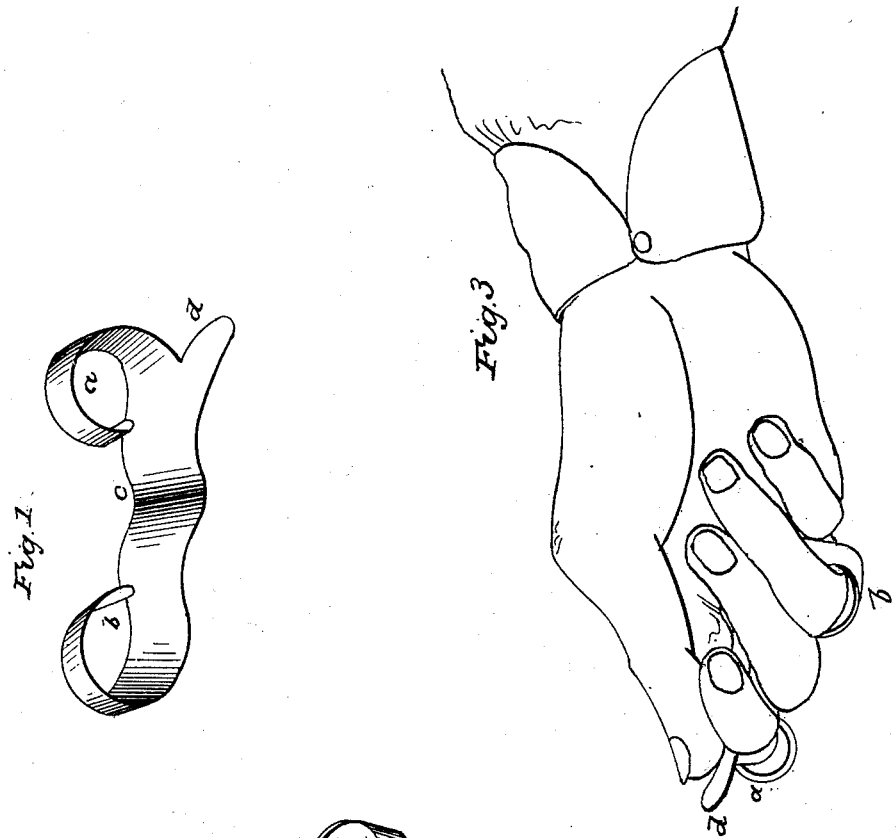

UNITED STATES PATENT OFFICE.

JAMES H. GANO, OF TREMONT, OHIO.

IMPROVEMENT IN CORN-HUSKERS.

Specification forming part of Letters Patent No. 57,888, dated September 11, 1866.

*To all whom it may concern:*

Be it known that I, JAMES H. GANO, of Tremont, in the county of Clarke and State of Ohio, have invented a new and useful Improvement in Hand Corn-Huskers, which I denominate the "Buckeye Husker;" and I do hereby declare the following to be a full, clear, and exact description of the same, reference being had to the accompanying drawings, making a part of this specification, in which—

Figures 1 and 2 represent perspective views of the instrument in question, taken from different sides thereof; and Fig. 3 represents the manner of securing the instrument to the hand, as when in use.

Similar letters of reference, where they occur in the separate figures, denote like parts in all the drawings.

My invention relates to an instrument to be worn upon the hand for the purpose of facilitating the operation of husking corn; and my invention consists in the particular form or shape of the husking instrument, so that it will accomplish the purpose mentioned and be worn with ease and comfort upon the hand or fingers.

To enable others skilled in the art to make and use my husker, I will proceed to describe the same with reference to the drawings.

The husker is made out of a single piece of sheet metal, such as steel, iron, copper, or brass, the two ends $a$ $b$ being bent around into rings, and the center portion, $c$, swelled out so as to lie snugly against one of the fingers of the hand, and a spur or projection, $d$, curved to fit the ball of the thumb.

The husker is worn upon the hand, as seen in Fig. 3. The first and third fingers of the hand are passed, respectively, through the rings $a$ $b$, while the second finger rests in the sunken portion $c$. The fingers are then closed, or nearly so, and the ball of the thumb placed upon the projection $d$, when it is ready to be used. The instrument so fits the closed fingers that it may be worn with perfect comfort to the user, while with the projection and his thumb he opens and strips down the husk from the ears with great ease and rapidity.

What I claim, and desire to secure by Letters Patent, is—

A corn-husker having upon it the rings $a$ $b$, curved or swelled portion $c$, and projection $d$, and worn upon the fingers, as and for the purpose herein set forth.

JAMES H. GANO.

Witnesses:
  E. M. DOTY,
  A. P. L. COCHRAN,
  WM. WHITE.